United States Patent Office 3,600,314

Patented Aug. 17, 1971

3,600,314

MAGNETIC COMPOSITIONS OF CHROMIUM OXIDE AND METHODS OF MANUFACTURE

Robert S. Haines, Boulder, Colo., assignor to International Business Machines Corporation, Armonk, N.Y.

No Drawing. Filed Dec. 22, 1969, Ser. No. 887,310
Int. Cl. C01g 37/02
U.S. Cl. 252—62.51 7 Claims

ABSTRACT OF THE DISCLOSURE

This invention relates to the formation of ferromagnetic chromium oxide compositions containing 59% to 62% chromium and 0.05% to 0.90% carbon combined with oxygen, and in the form of uniform, finely divided particles of tetragonal crystalline structure. The process of forming ferromagnetic chromium oxide consists of treating a chromium compound with carbon or carbon containing compound, and then subjecting the mixture to heat and pressure decomposition.

BACKGROUND OF THE INVENTION

Field of the invention

This invention relates to magnetic compositions and to novel methods for preparing them in finely divided particle form. More particularly, it relates to ferromagnetic compositions of carbon modified chromium oxide having tetragonal crystalline structure, and to methods for their preparation in finely divided particle form. Such particles are suitable for use, for example, in magnetic recording media, magnetic cores, and the like.

Description of the prior art

In the prior art, various types of magnetic compositions have been prepared in numerous ways. Included in the prior art magnetic compositions are chromium oxides having ferromagnetic properties. These magnetic chromium oxides have been nominally designated as chromium dioxide and have long been reported in the chemical literature. Early methods of preparation of ferromagnetic chromium oxide have been by heating chromium tri-oxide in oxygen and by pyrolysis of gaseous chromyl chloride. More recently, methods of producing ferromagnetic chromium oxide, primarily from chromium trioxide under conditions of both heat and pressure, and in the presence of water, have been reported. Within the last two decades, heightened interest and activity in the preparation of ferromagnetic chromium oxide has resulted in a substantial number of publications being made and patents being issued in this technology. In some instances, the utilization of preferential substrates during the formation of chromium dioxide, for example, by gas pyrolysis has been reported. In other instances, one or more specific modifying ingredient or oxidizing agent has been included in the reaction mixture during heat and pressure treatment to yield a ferromagnetic chromium oxide which may or may not be modified with an additive ingredient. In yet another form of activity, multi-step processes of treating various chormium compounds, with or without modifying ingredients or oxidizing agents, have been utilized to produce forms of ferromagnetic chromium oxide.

It is both useful and desirable to provide alternative methods of preparing magnetic chromium oxides for use, for example, in the manufacture of magnetic recording media.

SUMMARY OF THE INVENTION

It is an object of the present invention to provide carbon modified ferromagnetic chromium oxides by new and improved processes of treating chromium compounds with carbon or a carbon containing compound prior to thermal pressure decomposition.

A further object is to provide novel chromium oxide materials, including carbon as a component.

It is another object of the present invention to provide carbon containing ferromagnetic chromium oxide which is useful in the manufacture of magnetic recording media.

Other objects will appear hereinafter.

The present invention provides new types of uniform, finely divided particles of carbon modified ferromagnetic chromium oxide by treating a chromium compound, such as chromium tri-oxide, with carbon or a carbon containing compound and then heating the mixture at a temperature between about 250° C. and 500° C. while subjecting the reaction mixture to superatmospheric pressure. The carbon source may be equivalent to as little as about 0.1%, by weight, of the chromium compound, although amounts up to 50%, by weight, and greater may be used adavntageously. Reaction pressures ranging from 50 to 3000 atmospheres are operable to convert chromium compounds to ferromagnetic chromium oxide. Pressures of about 50 to 1000 atmospheres are preferred.

The source of carbon may be in the elemental form of carbon black, charcoal, or graphite, or it may be in any carbon compound characterized by a low molecular weight and a tendency to decompose rather than polymerize when subjected to heat. Included within this latter family of organic compounds are phthalic acid, phthalic anhydride, isophthalic acid, dimethyl sulfone, dimethyl sulfoxide, maleic anhydride, tetrachlorophthalic anhydride, fumaric anhydride, pyromellitic acid, trimellitic acid, chlorendic anhydride, dichlorophenol, the alkyl aryl polyether alcohols, and the low molecular weight ketones, such as butanone and propanone.

Intimate mixture and treatment of the chromium compound with the carbon source material may be obtained prior to thermal pressure processing in any suitable manner, such as by grinding the constituent ingredients together, by mutual dissolution, or by dissolving them in suitable common solvents or carriers. After mixing is completed, the reaction mixture of the carbon source material and the chromium compound is placed in a vessel in which it is both heated and subjected to superatmospheric pressure.

Carbon modified magnetic chromium oxide produced by the process of this invention, contains about 59–62% chromium and about 0.05 to 0.90% carbon combined with oxygen, and is in the form of finely divided particles of uniform size. The particles display a rutile tetragonal crystalline structure, and are acicular, having a length-to-width ratio of as much as 14 to 1 and an actual length in the range of about 0.3 to 13 microns.

If desired, modifying agents other than carbon and its compounds may be used in the process of this invention. Modifying agents, when used, are employed in amounts which are well defined by the prior art.

The foregoing and other objects, features, and advantages of the invention will be apparent from the following more particular description of the preferred embodiments of the invention.

DESCRIPTION OF THE PREFERRED EMBODIMENTS

In the following examples, most reactants were reagent grade chemicals; however, use of commercial grade chemicals, especially commercial grade sources of elemental carbon, is within the scope of this invention. Ferromagnetic particles produced by the method of the present invention were normally separated from the small amounts of unreacted and non-magnetic constituents by washing, and then dried. Powder samples of the magnetic compositions produced by the present invention were measured with a vibrating sample magnetometer, or VSM, at 4000 oersteds to determine their magnetic properties. Determination of the chemical content of the magnetic particles was obtained by both X-ray fluorescence spectroscopy and neutron activation. The chromium content was found to range from 59 to 62%, by weight, with the balance oxygen and less than 1% carbon, as reported for each example. Crystal structure was determined by examination of X-ray diffraction patterns. Particle shape, size, and length-to-width ratios were determined from electron micrographs of the particles.

EXAMPLE I

Chromium trioxide, $CrO_3$, (8.0 g.) and tetrachlorophthalic anhydride, (1.1 g.) were dissolved in 200 ml. of hot water. This solution was then evaporated to dryness in an open container. When tested with both a magnet and the VSM, at this time, the powder was found to be non-magnetic.

This dry powder was then placed in a Pyrex glass tube with a loose fitting glass stopper and the tube placed in an autoclave. The pressure vessel was then filled with liquid nitrogen, closed, and heated to 400° C. for one hour. During the heating cycle, the final pressure in the vessel was brought up to 4000 pounds per square inch (272 atmospheres). The black carbon modified chromium oxide particles formed within the tube were removed and tested for magnetic properties by packing a portion in a glass cylinder for measurement by the VSM. The saturation magnetization per gram, or sigma value, was 81.4 e.m.u./g. at 4000 oersteds, and the intrinsic coercivity of the material was 170 oersteds. The acicular particles were from 0.5 to 2.5 microns long and from 0.05 to 0.3 micron wide, and contained 0.17% carbon, by weight.

A multi-step variation of the present invention is also possible in which the organic compound and chromium compound are dissolved in solvent, evaporated to dryness, and then added to additional chromium compound in solvent and evaporated to dryness once more prior to thermal pressure decomposition. Alternatively, the organic compound and chromium compound may be refluxed in solvent, followed by the addition of more chromium compound to the refluxed solution prior to thermal pressure decomposition.

EXAMPLE II

Carbon modified ferromagnetic chromium oxide was prepared by dissolving 2.0 g. of paraterphenyl and 5.0 of chromium trioxide in 125 ml. of water. The water was evaporated and 5.0 g. of the resulting green powder was added to an additional 5.05 g. of chromium trioxide dissolved in another 125 ml. of water, and the solution once more evaporated to dryness. The powder residue remaining after each of the two evaporations was not found to exhibit any magnetic characteristics. The dry reaction mixture, following the second evaporation, was then placed in an autoclave and subjected to thermal pressure decomposition at a temperature of 410° C. and a pressure of 6900 p.s.i. (470 atm.). The resultant black carbon containing ferromagnetic chromium oxide powder had a sigma value of 84.3 e.m.u./g. and a coercivity of 132 oersteds. The acicular particles were from 0.5 to 3.0 microns long and from 0.05 to 0.7 micron wide. A carbon content of 0.52%, by weight, was found.

EXAMPLE III

A rutile ferromagnetic chromium oxide was prepared by placing 3.0 g. of phthalic acid and 10.0 g. of chromium trioxide in 120 ml. of water. The organic compound and chromium compound were dissolved and refluxed for 24 hours. The resulting brown solution was translucent, but there was no sign of the formation of a precipitate. Thirty grams of this solution and 6.0 g. of additional chromium trioxide were then dissolved in another 125 ml. of water and the resultant mixture evaporated to a dry powder. At this stage of treatment, the reaction mixture showed no magnetic characteristics. The powder was then placed in a Pyrex tube, the tube placed in a pressure vessel, and the vessel pressurized and heated as in the previous examples. After heating was completed, the vessel was cooled to room temperature, the pressure released, the vessel opened, and the finely divided black powder formed within the tube removed. It was determined on the VSM that the particles were ferromagnetic and had an intrinsic coercivity of 302 oersteds, and a sigma value of 46.3 e.m.u./g. The carbon content of the chromium dioxide was 0.16%, by weight, and X-ray diffraction revealed the acicular particles to be from 0.3 to 0.6 micron long and from 0.04 to 0.13 micron wide.

EXAMPLE IV

It has been found that ketones are suitable for use in the process of the present invention for the synthesis of carbon containing ferromagnetic chromium oxides having a coercivity greater than 200 oersteds.

A first solution of 10.0 g. of $CrO_3$ dissolved in 500 ml. of water was prepared. A second solution of 30.0 g. (35 ml.) of butanone (methylethylketone) dissolved in 250 ml. of water was prepared. The $CrO_3$ solution was heated and the butanone solution added to it in increments of about 50 ml. over a period of about 3 hours, with maintenance of the solution at its boiling point. The resulting mixture was allowed to cool and had the appearance of a dispersion.

One hundred ninety-six ml. of the dispersion was mixed with an additional 1.5 g. of $CrO_3$ and evaporated to dryness. The resulting non-magnetic powder was placed in a Pyrex tube and the tube placed in an autoclave and pressurized with air to a pressure of 1200 p.s.i. (82 atm.). The autoclave was then heated for 1 hour at 250° C. and for an additional hour at 390° C. After heating was completed, the vessel was cooled to room temperature, the pressure released, the vessel opened, and the finely divided black powder formed within the Pyrex tube removed and washed with water and alcohol. The powder was determined to be ferromagnetic chromium oxide containing less than 1% carbon and having a sigma value of 88 e.m.u./g. and an intrinsic coercivity of 237 oersteds. The particles were found to have lengths from 0.1 to 0.9 micron and widths of from 0.02 to 0.1 micron.

Organic surfactants may be utilized in the practice of the present invention. For example, Triton, an alkyl aryl polyether alcohol of the phenoxy polyethoxy ethanol type, marketed by Rohm and Haas, has been found to be suitable for the production of high coercivity ferromagnetic chromium oxide.

EXAMPLE V 6.0 g. of $CrO_3$ and 2.0 g. of Triton X–100 were dissolved in 200 ml. of water and the solution evaporated to dryness. The fine black non-magnetic powder thus formed was then ball milled in water, removed from the ball mill, and the paste filtered through a fine mesh wire screen. Then, 3.6 g. of $CrO_3$ was added to the paste and this mixture was also evaporated to dryness. The resulting non-magnetic powder was then placed in a Pyrex tube, covered with a loosely fitting stopper, and pressurized in an autoclave with air to 1000 p.s.i. (68 atm.). The autoclave was then heated to a temperature of 250° C. for 1 hour, followed by further heating at 400° C. for an additional hour, at which time the pressure in the autoclave reached 3000 p.s.i. (204 atm.). The autoclave was then cooled with water, the pressure released, and a fine black ferromagnetic powder removed from the Pyrex tube. The powder was washed with water and then with methyl alcohol. After drying at 40° C., the intrinsic coercivity of the ferromagnetic chromium oxide powder was determined by the VSM to be 347 oersteds, and the sigma value 96 e.m.u./g. The particles had lengths of from 0.3 to 0.7 micron and widths of from 0.01 to 0.03 micron, and contained 0.7%, by weight, carbon.

In a similar experiment, 12.0 g. of $CrO_3$ was dissolved in 400 ml. of water. This solution was then refluxed, with the addition of 50 ml. of aqueous Triton X–100 at 30-minute intervals over a period of 6 hours. The total amount of Triton X–100 thus added in the aqueous solution was 5 g. After the final addition of the Triton X–100 solution, refluxing was ended and a 208 ml. portion removed from the refluxing vessel. To this portion of the solution was added 4.0 g. of additional $CrO_3$, after which the mixture was evaporated to dryness. The resulting non-magnetic powder was then placed in a Pyrex tube with a loosely fitting stopper, and the tube placed in an autoclave and pressurized to 1000 p.s.i. (68 atm.) with air. The temperature in the autoclave was raised to 250° C. for 1 hour, followed by further heating at 400° C. for another hour, at which time the pressure in the vessel reached 3150 p.s.i. (214 atm.). The autoclave was then cooled with water, depressurized, the vessel opened, and the Pyrex tube containing a block powder removed therefrom. The powder was removed from the tube, washed with water and methyl alcohol, and then dried at 40° C. in a vacuum oven. The dry powder was carbon containing ferromagnetic chromium oxide and exhibited an intrinsic coercivity of 210 oersteds, and a sigma value of 87 e.m.u./g. as measured on the VSM.

Modifying ingredients may be included in the various processes taught by the present invention with beneficial results.

EXAMPLE VI

In this example, 18.0 g. of $CrO_3$ and 6.0 g. of Triton X–100 were dissolved in hot water and evaporated to dryness, leaving a residue of black non-magnetic powder. This powder was treated at 250° C. with a constant flow of air at 200 cc./min., with the resulting product exhibiting no magnetic characteristics. Then, 2.5 g. of this powder was ball milled and mixed with 0.2 g. of $Ce(NO_3)_3 \cdot 6H_2O$ and an additional 4.5 g. of $CrO_3$ in 200 ml. of water. This reaction mixture was heated until it was evaporated to a thick paste and placed in a Pyrex tube. The Pyrex tube containing the reaction mixture was closed with a loosely fitting joint and placed in a pressure vessel which was pressurized to 1000 p.s.i. (68 atm.) with air, followed by heating to 250° C. for 1 hour and subsequent heating at 370° C. for a second hour. The final pressure within the vessel was 4000 p.s.i. (272 atm.). The vessel was then cooled with water, the pressure released, and the Pyrex tube removed. The black powder contained within the tube was found to be carbon and cerium modified ferromagnetic chromium oxide having a sigma value of 77.2 e.m.u./g. and a coercivity of 416 oersteds. The powder was found to contain 0.05% carbon, by weight, and be in the form of a mixture of particles having lengths of from 0.3 to 0.6 micron and widths of from 0.01 to 0.09 micron.

Simultaneously with the above thermal pressure decomposition, and equal amount of the original Triton X–100-treated $CrO_3$ was reacted in a separate tube in the same pressure vessel, with the exception that no cerium nitrate was added to this second portion of the reaction mixture. The resulting ferromagnetic chromium oxide powder, without the cerium modifying ingredient, exhibited a sigma value of 77 e.m.u./g. and an intrinsic coercivity of 340 oersteds. The particles had lengths of from 0.3 to 0.9 micron and widths of from 0.03 to 0.1 micron.

EXAMPLE VII

A high coercivity ferromagnetic chromium oxide can be prepared in accordance with the present invention utilizing a dialkyl sulfoxide treatment of chromium compounds.

10.0 g. of $CrO_3$ and 100.0 g. of dimethyl sulfoxide (DMSO) were dissolved in 120 ml. of water. This solution was heated, with refluxing, and another 90.0 g. of DMSO added over a 2-hour period in increments of 40 and 50 g. Refluxing was continued for 24 hours with the resultant formation of a translucent brown solution. After cooling, this solution was centrifuged with the addition of acetone, and a brown precipitate collected. The precipitate was washed twice with acetone and dried. Then, 1.5 g. of the precipitate was ball milled with water for 2 hours, filtered, and an additional 3.0 g. of $CrO_3$ added to the mixture. This mixture was then evaporated to dryness. A 3.5 g. portion of the dry mixture was then added to an 8.0 g. solution of $CrO_3$ in water and this solution was also evaporated to dryness. The resulting non-magnetic powder was placed in a Pyrex tube, pressurized with liquid nitrogen, and heated at 250° C. for 1 hour followed by further heating at 400° C. for another hour, to a final pressure of about 6900 p.s.i. (470 atm.). The tube was then removed from the pressure vessel and found to contain ferromagnetic chromium oxide having a sigma value of 68.7 e.m.u./g. and an intrinsic coercivity of 219 oersteds.

It has been found that when carbon, in the elemental form, carbon is mixed or co-mingled with a chromium compound prior to thermal-pressure conversion to ferromagnetic chromium oxide, the coercivity of the resulting ferromagnetic particles is increased.

EXAMPLE VIII

A rutile ferromagnetic chromium oxide was prepared by placing 1.0 g. of carbon black and 15.0 g. of $CrO_3$ in a beaker with water. The dispersion was evaporated to form a thick nonmagnetic paste, and the paste placed in a Pyrex glass thimble with a loose ground glass top. The loosely closed thimble was then placed in an autoclave and pressurized with air to 1000 p.s.i. (68 atm.). The autoclave was then heated to 250° C. for 1 hour, followed by additional heating at 370° C. for another hour to a final pressure of 2750 p.s.i. (187 atm.). The carbon modified chromium oxide particles formed within the thimble were washed with water three times and with methanol once, dried, and tested using the VSM. The particles were found to have an intrinsic coercivity of 151 oersteds, and a sigma value of 72.4 e.m.u./g. Carbon was determined to be present in the particles, but at less than 1%, by weight.

EXAMPLE IX

In this example, 1.0 g. of carbon black was ball milled with 0.5 g. of $CrO_3$ and water for four hours and the resultant mixture added to 14.5 g. of $CrO_3$ dissolved in 200 ml. of water. This mixture was then evaporated to a thick paste and placed in a Pyrex thimble with a loose ground glass cover, the thimble placed in an autoclave, and the autoclave pressurized and heated as in Example VIII. The autoclave was then cooled, the pressure released, and the carbon modified ferromagnetic chromium oxide removed from the thimble, washed and dried. When tested with the VSM, the sample was found to have an intrinsic coercivity of 265 oersteds and a sigma value of 66 e.m.u./g. The washed sample contained 0.09% carbon, by weight. It was noted that some carbon black was washed out of the sample during the washing procedures following the autoclaving operation.

EXAMPLE X

Carbon modified ferromagnetic chromium oxide was prepared, as follows. A 1.0 g. sample of colloidal graphite was heated to remove the carrier alcohol and the resulting fine graphite powder added to 15.0 g. of $CrO_3$ dissolved in 200 ml. of water. The mixture was evaporated to a thick paste and the paste added to a Pyrex thimble with a loose ground glass top. Following presurization and heating in an autoclave, as in the previous examples, the thimble was found to contain a black ferromagnetic powder which, after washing, was determined to be ferromagnetic chromium oxide containing 0.32%, by weight, carbon. When tested, the tetragonal crystalline powder was found to have an intrinsic coercivity of 175 oersteds and a sigma value of 84.7 e.m.u./g.

Utilizing the teaching of the present invention to prepare finely divided carbon containing chromium compounds for use as nucleating sites in decomposition reactions with additional chromium compounds results in carbon containing ferromagnetic particles having high coercivities and excellent sigma values.

EXAMPLE XI

Nucleant preparation

Finely divided non-magnetic carbon containing chromium compounds for use as nucleating sites in the preparation of ferromagnetic chromium oxide were prepared by mixing 36.0 g. of $CrO_3$ and 8.0 g. of Triton X–100, an alkyl phenoxy polyethoxy ethanol, in 800 ml. of water. The mixture was heated to dryness to produce a non-magnetic black powder which was then ground in a mortar with a pestle and placed in a reaction boat in a tube oven. Air was passed through the tube oven at the rate of 200 cc. per minute and the temperature slowly raised from room temperature to 125° C., then to 150° C., and finally to 210° C. over a period of more than 6 hours. When cool, the reaction mixture was found to consist of non-magnetic particles of about 0.004 to about 0.03 micron in length. These particles serve as nucleant sites for the formation of carbon modified ferromagnetic chromium oxide.

Ferromagnetic carbon modified chromium oxide preparation

Black nucleant powder from above, in the amount of 2.5 g., was ball milled with water for an extended period of time, and then 4.5 g., of $CrO_3$ was added to the mixture. When removed from the ball mill, the mixture was heated until a thick non-magnetic paste was formed. This paste was placed in a loosely stoppered Pyrex tube, the tube placed in an autoclave, the autoclave pressurized to 1050 p.s.i. with air, then heated to 250° C. for 1 hour and then to 366° C. for another hour, a final pressure of 4500 p.s.i. (308 atm.) being obtained within the autoclave. The autoclave was then cooled, the pressure released and the pyrex tube charge washed with water and alcohol and dried. The carbon modified ferromagnetic chromium oxide obtained at this point had a sigma value of 93.6 e.m.u./g. and a coercivity of 367 oersteds.

The previous experiment was repated and a carbon modified ferromagnetic chromium oxide having an intrinsic coercivity of 360 orsteds and a sigma value of 90.2 e.m.u./g. was obtained.

Two additional samples of nucleating material weighing 3.5 g. each were ball milled separately. and 5.0 g. of $CrO_3$ was added to each. Each resultant mixture was evaporated to form a thick non-magnetic paste, and each sample of paste was placed in a separate loosely stoppered Pyrex tube, the tubes placed in an autoclave, the autoclave pressurized to 1150 p.s.i. with air and heated to 250° C. for 1 hour. The autoclave was then cooled with water, depressurized and the resultant rutile carbon modified ferromagnetic chromium oxide removed from the Pyrex tubes and tested. One sample had an intrinsic coercivity of 378 oersteds and a sigma value of 88.5 e.m.u./g. The other sample had an intrinsic coercivity of 329 oersteds and a sigma value of 80 e.m.u./g.

Carbon content of the ferromagnetic chromium oxides produced in the foregoing examples was about 0.07%, by weight. The particles had lengths of about 0.3 to 0.7 micron and widths of about 0.01 to 0.03.

A second preparation of nucleating material, prepared as detailed in Example XI, when reacted with $CrO_3$ under thermal-pressure decomposition conditions, as above, resulted in the formation of rutile carbon modified ferromagnetic chromium oxide having a coercivity of 460 oersteds, a sigma value of 90 e.m.u./g., in the form of particles having lengths of 0.2 to 0.6 micron and widths of 0.01 to 0.04 micron.

Any chromium compound may be used in the process of the present invention, and the hexavalent compounds, including the trioxide, the halides, and the oxychloride are representative examples of compounds which are readily available and which are capable of use with good results.

While water is a convenient solvent for the initial steps of mixing the chromium and carbon containing components of this process, other solvents, including organic liquids, can be used for the same purpose. Similarly, dry grinding by simple mortar and pestle, or by ball milling with water or other liquids may be resorted to in order to obtain the desired consistency in the reactants.

The thermal pressure reaction process may be carried out using either completely dry ingredients or in the presence of water or hydrated constiuents. However, the presence of water during the reaction is not essential. The use of other modifying ingredients, in addition to cerium, is within the teaching of this invention, and actual success with antimony, tellurium, and iron clearly indicates that additive improvements may be obtained using other known modifying agents.

Uses for the materials produced in the foregoing examples are well known. For example, the ferromagnetic compositions produced by the examples may be mixed with non-magnetic, organic, film-forming binders and utilized to prepare magnetic recording media.

Typical, but not limiting, binders for use singularly or in combination for preparing various recording media, including ferromagnetic particles produced in accordance with this invention, are polyesters, cellulose esters and ethers, epoxides, vinyl chloride, vinyl acetate, acrylate and styrene polymers and copolymers, polyurethanes, polyamides, aromatic polycarbonates, and polyphenyl ethers.

A wide variety of solvents may be used for forming a dispersion of the fine ferromagnetic particles, produced in the foregoing examples, with various binders. Organic solvents, such as ethyl, butyl, and amyl acetate, isopropyl alcohol, dioxane, acetone, methylisobutyl ketone, cyclohexanone, and toluene are useful for this purpose. The particle-binder dispersion may be applied to a suitable substrate by roller coating, gravure coating, knife coating, extrusion, or spraying of the mixture onto the backing, or by other known methods.

In preparing recording media, the magnetic particles usually comprise about 40–90% by weight of the solids in the film layer applied to the substrate. The substrate is usually a flexible resin, such as polyester or cellulose acetate material, although other flexible mateirals as well as rigid base materials are more suitable for some uses.

The specific choice of non-magnetic substrate binder, solvent or method of application of the magnetic composition to the support will vary with the properties desired and the specific form of the magnetic recording medium being produced.

In preparing magnetic cores and permanent magnets, the products of the examples are mixed with non-magnetic plastic or filler in an amount of about 33–50% by volume of the magnetic material; the particles aligned in a magnetic field; and the mixture pressed into a firm magnet structure. Alignment of the particles may be accomplished in an externally applied DC magnetic field of about 4000 gauss, or more. Pressures may vary widely in forming the magnet. Pressures up to 100,000 p.s.i. and fields of 28,000 gauss have been used commercially.

While the invention has been particularly shown and described with reference to preferred embodiments thereof, it will be understood by those skilled in the art that various changes in form and details may be made therein without departing from the spirit and scope of the invention.

What is claimed is:

1. A process for producing carbon modified ferromagnetic chromium oxide compositions of tetragonal crystal structure containing about 59 to 62%, by weight, of chromium and about 0.05% to 0.90%, by weight, of carbon, the balance being oxygen, which comprises:

forming a mixture of chromium trioxide and at least one carbon source material in an amount of at least 0.1% by weight of said chromium trioxide selected from the group consisting of elemental carbon and organic carbon compounds characterized by a low molecular weight and which decompose to yield elemental carbon when subjected to heating as hereinafter defined; and then heating the mixture of chromium trioxide and carbon source material at a temperature within the range of about 250° C. to 500° C. and under a pressure of at least 50 atmospheres.

2. The process of claim 1 in which the carbon source material is selected from the group consisting of carbon black, charcoal, graphite, phthalic acid, phthalic anhydride, isophthalic acid, dimethyl sulfone, dimethyl sulfoxide, maleic anhydride, tetrachlorophthalic anhydride, fumaric anhydride, pyromellitic acid, trimellitic acid chlorendic anhydride, dichlorophenol, paraterphenyl, alkyl aryl polyether alcohols, and ketones.

3. The process of claim 2 in which the carbon source material is selected from the group consisting of carbon black, graphite, tetrachlorophthalic anhydride, paraterphenyl, phthalic acid, butanone, alkyl phenoxy polyethoxy ethanol, and dimethyl sulfoxide.

4. The process of claim 1 in which the mixture is heated under a pressure within the range of about 50 to 3000 atmospheres.

5. The process of claim 4 in which the mixture is heated under a pressure within the range of about 50 to 1000 atmospheres.

6. An acicular carbon modified chromium oxide ferromagnetic composition having a tetragonal crystal structure, consisting essentially of 59% to 62%, by weight, of chromium, said chromium being present as chromium oxide and about 0.05% to 0.90% by weight, of carbon.

7. The carbon modified chromium oxide ferromagnetic composition of claim 6 in which said ferromagnetic composition has an intrinsic coercivity within the range of about 100 to 460 oersteds and a sigma value within the range of about 40 to 96 e.m.u./g.

References Cited

UNITED STATES PATENTS

| | | | |
|---|---|---|---|
| 3,034,988 | 5/1962 | Ingraham et al. | 252—62.51 |
| 3,078,147 | 2/1963 | Cox | 252—62.51X |
| 3,117,093 | 1/1964 | Arthur et al. | 252—62.51 |
| 3,371,043 | 2/1968 | Hund et al. | 252—62.51 |
| 3,512,930 | 5/1970 | Bottjer et al. | 252—62.51X |

TOBIAS E. LEVOW, Primary Examiner

J. COOPER, Assistant Examiner

U.S. Cl. X.R.

23—145